(12) United States Patent
Hvidsten

(10) Patent No.: US 8,259,813 B2
(45) Date of Patent: Sep. 4, 2012

(54) METHOD AND SYSTEM FOR IMPROVING COLOR SHARPNESS IN VIDEO AND IMAGES

(75) Inventor: Knut Inge Hvidsten, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 928 days.

(21) Appl. No.: 12/339,703

(22) Filed: Dec. 19, 2008

(65) Prior Publication Data

US 2009/0245387 A1    Oct. 1, 2009

(30) Foreign Application Priority Data

Dec. 19, 2007    (NO) .................................. 20076555

(51) Int. Cl.
*H04N 7/12*    (2006.01)

(52) U.S. Cl. ......... 375/240.25; 375/240.26; 375/240.27; 375/240.28; 375/240.29; 345/589

(58) Field of Classification Search .............. 375/240.25–240.29; 345/589
See application file for complete search history.

(56) References Cited

U.S. PATENT DOCUMENTS

| | | | |
|---|---|---|---|
| 6,539,120 | B1 | 3/2003 | Sita et al. |
| 6,993,076 | B1 * | 1/2006 | Comer et al. ............ 375/240.16 |
| 7,072,512 | B2 | 7/2006 | Mehrotra |
| 2004/0252759 | A1 | 12/2004 | John Winder et al. |
| 2006/0291565 | A1 | 12/2006 | Chen |
| 2007/0097142 | A1 * | 5/2007 | Gies .............................. 345/589 |

FOREIGN PATENT DOCUMENTS

| | | |
|---|---|---|
| EP | 1 406 448 A2 | 4/2004 |
| EP | 1 473 670 A2 | 11/2004 |
| WO | WO 2004/114670 A2 | 12/2004 |

OTHER PUBLICATIONS

Resolution Enhancement of Hyperspectral Imagery Using Coincident Panchromatic Imagery and a Stochastic Mixing Model, Eismann, M. T. et al. Advances in Techniques for Analysis of Remotely Sensed Data, 2003 IEE Workshop on, Oct. 27-28, 2003, Piscataway, NJ, USA, ISBN 978-07803-8250-0, ISBN 0-7803-8350-8, (p. 282-289).

* cited by examiner

*Primary Examiner* — Yin-Chen Shaw
(74) *Attorney, Agent, or Firm* — Oblon, Spivak, McClelland, Maier & Neustadt, L.L.P.

(57) ABSTRACT

A method in a decoding process for determining full-resolution chroma pixel information (Cx) corresponding to a spatial fraction of a still-image or a video-frame represented by full-resolution luma pixel information (Y) and decimated chroma pixel information (Cxd) decimated by a decimation process, including: receiving the full-resolution luma pixel information at video or image processing apparatus; decimating, at the video or image processing apparatus, the full-resolution luma pixel information (Y) by said decimation process resulting in a decimated spatial luma fraction (Yd); determining, with the video or image processing apparatus, if the decimated chroma pixel information (Cxd) at least approximately can be expressed by {(Yd+shift1)*scale–shift2}; storing, in an electronic memory of the video or image processing apparatus, values of scale, shift1, and shift2 that result in a minimum deviation between {(Yd+shift1)*scale–shift2} and Cxd; and calculating, with the video or image processing apparatus, {(Y+shift1)*scale–shift2} as a first candidate (Cx1) for the full-resolution chroma pixel information (Cx).

16 Claims, 10 Drawing Sheets

METHOD AND SYSTEM FOR IMPROVING COLOR SHARPNESS IN VIDEO AND IMAGES

CROSS-REFERENCE TO RELATED APPLICATIONS

The present application claims priority under 35 U.S.C. §119 to Norwegian Application Number 20076555, filed in the Norwegian patent office on Dec. 19, 2007, the entire contents of which is hereby incorporated by reference. The present application also claims the benefit of provisional application No. 61/015,051, entitled A Method for Improving Color Sharpness in Video and Images, filed on Dec. 19, 2007, the entire contents of which is hereby incorporated by reference.

FIELD OF TECHNOLOGY

Embodiments described herein relate to video and still-image compression systems and methods, and in particular to compression/decompression of digital video systems.

BACKGROUND

Transmission of moving pictures in real-time is employed in several applications like e.g. video conferencing, net meetings, TV broadcasting and video telephony.

However, representing moving pictures requires much information as digital video typically is described by representing each pixel in a picture with 24 bits (3 Byte). Such uncompressed video data results in large bitrates, and cannot be transferred over conventional communication networks and transmission lines in real time due to limited bandwidth.

Thus, enabling real time video transmission requires a high level of data compression. Data compression may, however, compromise picture quality. Therefore, great efforts have been made to develop compression techniques allowing real time transmission of high quality video over bandwidth limited data connections.

Many video compression standards have been developed over the last 20 years. Many of those methods are standardized through ISO (the International Standards organization) or ITU (the International Telecommunications Union). Besides, a number of other proprietary methods have been developed. The main standardization methods are: ITU: the H.261 standard, the H.262 standard, the H.263 standard, the H.264/AVC standard (each of which is incorporated herein by reference in its entirety); and ISO: the MPEG1 standard, the MPEG2 standard, and the MPEG4/AVC standard (each of which is incorporated herein by reference in its entirety).

Video compression formats rely on statistical properties of the input data. Prior to the standardized video compression/decompression, the raw video data has to be converted to a format suitable for compression. This format is described in the standards, but the process of converting to/from it is to some degree left to the developer. The conversion process is a lossy process as it includes spatial decimation and interpolation. The electronic representation of an image can commonly be interpreted as luma-information (roughly corresponding to "black-and-white" content) and a number of chroma (color-difference) channels that form an image. In this case, the luma and chroma information is transformed from a discrete 2-dimensional matrix of pixels, each containing a red-green-blue sub-pixel triplet, which typically is the case for image sensors and displays. The color-space of the luma and chroma information is often denoted as YCbCr (luma, blue chroma difference, red chroma difference) and the spatial information of the chroma channel are reduced (decimated) vertically and/or horizontally with a factor of between 1:1 and 4:1. One important format is "YCbCr 4:2:0", which is used in different forms in most of the MPEGx and H.26x video compression formats mentioned above. The principle of spatial decimation (reducing the number of pixels) and interpolation (increasing the number of pixels) is to remove information that cannot be transmitted reliably, and to represent the available information in a perceptually pleasing way, respectively. Since the decimation/interpolation of chroma channels is a lossy process, different methods create different artifacts that may or may not be objectionable for a given set of full-resolution input images and viewers.

An example of a spatial linear decimation according to a conventional technique is described below. For a filter kernel of length K=2 indexed by k:

$$\{hk\} = \{0.5, 0.5\}$$

Linear filtering of input signal x(n) consisting of pixel values at offsets n, using kernel h:

$$y(n) = \text{conv}(x(n), h(n)) = 0.5 * x(n) + 0.5 * x(n-1)$$

Dropping samples and shifting to the desired phase:

$$z(n - 0.5) = \begin{cases} y(n), & n = 2, 4, 6 \\ 0, & \text{else} \end{cases}$$

In practical systems, non-integer storage cells are uncommon, so z would be shifted to a practical phase, and zero-components discarded:

$$g(m) = \begin{cases} y(2*m), & 1 < m < 3 \\ 0, & \text{else} \end{cases}$$

The method outlined above is the basis for general image decimation and chroma-channel decimation. Interpolation can be described in a very similar manner. The objective is to "leak" values across pixel boundaries before or after changing the number of pixels so that the perceived image stays relatively constant even though the number of pixels used in describing it changes.

Video conference data containing a mixture of continuous tone content and palletized content are now quite common. Examples include screen capture images, web pages, educational and training videos (especially those containing screen capture images or web pages), and business presentations, among others. Web pages often include photographs interspersed among text and other palettized content. In addition to mixed content, it is also very common to transmit two parallel streams in a video conference, one including video content and one including data content, such as presentations or screen shots. However, all data is coded and decoded with a coding scheme as described above, which is most optimal for continuous tone pictures, i.e. video pictures captured by a video camera. This implies that the perceived quality for input-images containing sharp edges and abrupt transitions like in plain text or line art etc. are reduced, since the sharp edges to some degree are spread out spatially by the coding process. Why this occurs is explained in the following accompanied with the FIGS. 1-7.

FIG. 1 contains a simplistic 1×6 pixel image containing the RGB-values [0 0 0] and [255 0 0]. The same image information is also shown in FIG. 2 as a 1-dimensional bar graph, showing how the red intensity has an abrupt change for the right half of this image.

$$Image_{rgb} = \begin{cases} red: & 0 & 0 & 0 & 255 & 255 & 255 \\ green: & 0 & 0 & 0 & 0 & 0 & 0 \\ blue: & 0 & 0 & 0 & 0 & 0 & 0 \end{cases}$$

In FIG. 3, the same image information is transformed to the ITU-R BT.601 YCbCr color space where black bars represent Y (luma) information, while cyan and magenta bars represent Cb and Cr values, respectively. The spatial resolution is not changed.

$$Image_{YCbCr} = \begin{cases} red: & 16 & 16 & 16 & 82 & 82 & 82 \\ green: & 128 & 128 & 128 & 90 & 90 & 90 \\ blue: & 128 & 128 & 128 & 240 & 240 & 240 \end{cases}$$

In FIG. 4, however, the chroma channels have been decimated by a factor of 2, with representation levels at 1.5, 3.5 and 5.5. The method for decimation was a simple mean of the 2 closest source pixels. This is similar to a FIR filter using a 2-tap kernel of [0.5 0.5] followed by picking every second pixels.

$$Image_{YCbCr} \text{decimated} = \begin{cases} red: & 16 & 16 & 16 & 82 & 82 & 82 \\ green: & 128 & 110 & 90 \\ blue: & 128 & 184 & 240 \end{cases}$$

While the edge is still visible for the luma channel, it has been smoothed out for the chroma channels, since they have to represent both the black and the red levels that fall into the x=[2.5, 4.5] area.

In FIG. 5, new, higher pixel-count chroma vectors were found by simply repeating the values from FIG. 4. This is equivalent to zero-filling every second sample, then filtering with a FIR-kernel of [1 1].

$$Image_{YCbCr} \text{interpolated} = \begin{cases} red: & 16 & 16 & 16 & 82 & 82 & 82 \\ green: & 128 & 128 & 110 & 110 & 90 & 90 \\ blue: & 128 & 128 & 184 & 184 & 240 & 240 \end{cases}$$

Finally, FIG. 6 and FIG. 7 show that the reconstructed image has visible errors along the transition. Not only is the red color blurred, but we get discoloring (change in the relative rgb-mix). The exact value and size of such artifacts is a basic property of the decimation/interpolation technique employed.

$$Image_{YCbCr} \text{interpolated} = \begin{cases} red: & 0 & 0 & 89 & 166 & 255 & 255 \\ green: & 0 & 0 & 0 & 38 & 0 & 0 \\ blue: & 0 & 0 & 0 & 38 & 0 & 0 \end{cases}$$

The initial and final rgb matrixes use 6(pixels)×3(colors) =18 bytes to store or transmit this one-dimensional image. The 2× subsampled YCbCr alternative used 6 (lumapixels) and 2×3 (chromapixels) for a total of 12 bytes. If a more realistic example was used, the savings could be larger by decimating chroma in two dimensions. If considered as a bandwidth-problem, this image clearly could be transmitted as a full-resolution luma channel, and a table mapping the luma-values to full-color rgb triplets:

$$Image_{mapped} = \begin{cases} Y: [16 \ 16 \ 16 \ 82 \ 82 \ 82] \\ Map_{Y \to rgb} : \begin{cases} Y_{16} = [0 \ 0 \ 0] \\ Y_{82} = [255 \ 0 \ 0] \end{cases} \end{cases}$$

That could produce 6+2×3 bytes for transmission, just like the YCbCr-decimated in this example does, but with no quality loss. The problem basically is that the system for bandwidth reduction is optimized for slowly varying, full-color sources, such as photographic content. If the (full) spatial resolution of the luma-channel could be combined with the reduced spatial resolution of the chroma-channels to produce "local color maps", images with sharp edges correlated in luma and chroma, but low usage of the entire color space would predictable look better. One way of solving this problem is described in U.S. Pat. No. 7,072,512 ('512), which is hereby incorporated by reference herein in its entirety. In this publication, an image segmentation algorithm identifying "continuous tone" image content e.g. photographic content, and "palletized" image content, e.g. text, is disclosed. Images to be transmitted are analyzed by the algorithm and based on the result of this analysis, coded by a codec specialized for the content type identified. By coding "palletized" image content with a coding scheme adjusted for this type of content, the problem of blurring sharp edges can be avoided.

However, since different coding schemes are used on the transmitting side, the receiving side is required to have the corresponding different decoding schemes installed and vice versa. Consequently, '512 is not able to solve the problem from in a media stream coded on a conventional, standardized way, but requires specialized codecs on both sides.

SUMMARY

A method in a decoding process for determining full-resolution chroma pixel information (Cx) corresponding to a spatial fraction of a still-image or a video-frame represented by full-resolution luma pixel information (Y) and decimated chroma pixel information (Cxd) decimated by a decimation process, including: receiving the full-resolution luma pixel information at video or image processing apparatus; decimating, at the video or image processing apparatus, the full-resolution luma pixel information (Y) by said decimation process resulting in a decimated spatial luma fraction (Yd); determining, with the video or image processing apparatus, if the decimated chroma pixel information (Cxd) at least approximately can be expressed by {(Yd+shift1)*scale−shift2}; storing, in an electronic memory of the video or image processing apparatus, values of scale, shift1, and shift2 that result in a minimum deviation between {(Yd+shift1) *scale−shift2} and Cxd; and calculating, with the video or image processing apparatus, {(Y+shift1)*scale−shift2} as a first candidate (Cx1) for the full-resolution chroma pixel information (Cx).

The method may further include: calculating a quality parameter (Q) by comparing {(Yd+shift1)*scale−shift2} with Cxd; interpolating Cxd, by an interpolation process corresponding to the decimation process, resulting in a second candidate (Cx2) for the full-resolution chroma pixel information (Cx); and combining the first and the second candidates according to the quality parameter to create the full-resolution chroma pixel information (Cx).

In the above-noted method, the quality parameter may be a floating number from 0 to 1, wherein 0 appears when there is no match between {(Yd+shift1)*scale−shift2} and Cxd, and 1 appears when there is an optimal match between {(Yd+shift1)*scale−shift2} and Cxd.

In the above-noted method, the step of combing the first and the second candidates according to the quality parameter may include creating the full-resolution chroma pixel information (Cx) as a linear mix between the first and second candidates according to the expression Cx=Q*Cx1+(1−Q)*Cx2.

In the above-noted method, the full resolution chroma pixel information may include blue chroma difference information.

In the above-noted method, the full resolution chroma pixel information may include red chroma difference information.

In the above-noted method, the spatial fraction may correspond to a square block of pixels, and that shift1 may be −Yd$_{center}$, where Yd$_{center}$ is a center pixel value of Yd, shift2 may be −Cxd$_{center}$, where Cxd$_{center}$ is a center pixel value of Cxd, and scale may be (Cxd+shift2)/(Yd+shift1).

An apparatus configured to implement a decoding process for determining full-resolution chroma pixel information (Cx) corresponding to a spatial fraction of a still-image or a video-frame represented by full-resolution luma pixel information (Y) and decimated chroma pixel information (Cxd) decimated by a decimation process, including: a decimating unit configured to decimate the full-resolution luma pixel information (Y) by said decimation process resulting in a decimated spatial luma fraction (Yd); a processor configured to determine if the decimated chroma pixel information (Cxd) at least approximately can be expressed by {(Yd+shift1)*scale−shift2}; and a storage unit configured to store values of scale, shift1, and shift2 that result in a minimum deviation between {(Yd+shift1)*scale−shift2} and Cxd, wherein the processor is configure to calculate {(Y+shift1)*scale−shift2} as a first candidate (Cx1) for the full-resolution chroma pixel information (Cx).

In the above-noted apparatus, the processor may be is further configured to calculate a quality parameter (Q) by comparing {(Yd+shift1)*scale−shift2} with Cxd, interpolate Cxd, by an interpolation process corresponding to the decimation process, resulting in a second candidate (Cx2) for the full-resolution chroma pixel information (Cx), and to combine the first and the second candidates according to the quality parameter to create the full-resolution chroma pixel information (Cx).

In the above-noted apparatus, the quality parameter may be a floating number from 0 to 1, wherein 0 appears when there is no match between {(Yd+shift1)*scale−shift2} and Cxd, and 1 appears when there is an optimal match between {(Yd+shift1)*scale−shift2} and Cxd.

In the above-noted apparatus, the processor may be further configured to create the full-resolution chroma pixel information (Cx) as a linear mix between the first and second candidates according to the expression Cx=Q*Cx1+(1−Q)*Cx2.

In the above-noted apparatus, the full resolution chroma pixel information may include blue chroma difference information.

In the above-noted apparatus, the full resolution chroma pixel information may include red chroma difference information.

In the above-noted apparatus, the spatial fraction may correspond to a square block of pixels, and that shift1 may be −Yd$_{center}$, where Yd$_{center}$ is a center pixel value of Yd, shift2 may be −Cxd$_{center}$, where Cxd$_{center}$ is a center pixel value of Cxd, and scale may be (Cxd+shift2)/(Yd+shift1).

A computer readable storage medium encoded with instruction, which when executed by a computer causes the computer to implement the above-noted method.

DETAILED DESCRIPTION

In the following, exemplary embodiments of the invention will be described. However, a person skilled in the art will realize other applications and modifications within the scope of the invention as defined in the enclosed claims.

One solution to the problem described above is to allow some "leakage" of edges and high-frequency content from the full-resolution luma-channel into the low-resolution chroma channels. This rests on the premise that luma and chroma source channels are highly correlated, as would be the case with, e.g., red text on a black background. The design of a practical interpolation for accomplishing this, with acceptable worst-case characteristics and complexity suitable for real-time low-cost applications, is however, non-trivial.

The exemplary embodiment of the present invention is adjusted to operate on parts of the image (blocks, lines etc), and to investigate the conformity between the available decimated chroma-information with decimated luma-information. If a good fit can be found, i.e. appropriate shift and scale-parameters can be determined to express decimated chroma values with decimated luma values, those parameters are applied on the full-resolution luma values for obtaining estimated full-resolution chroma values instead of interpolation. If a good fit cannot be found, the full-resolution chroma values will gradually deteriorate to a standard fallback interpolation method. This process is repeated for the entire picture and for each chroma-channel.

Figure 1:
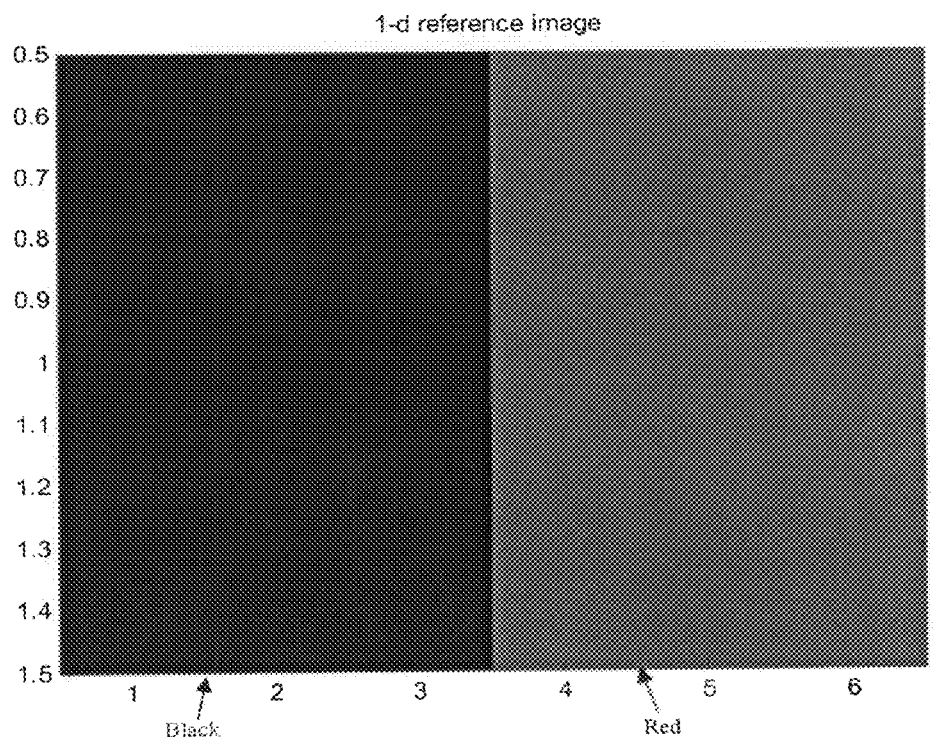
FIG. 1 shows a reference picture containing abrupt transition from black to red.
Figure 2:
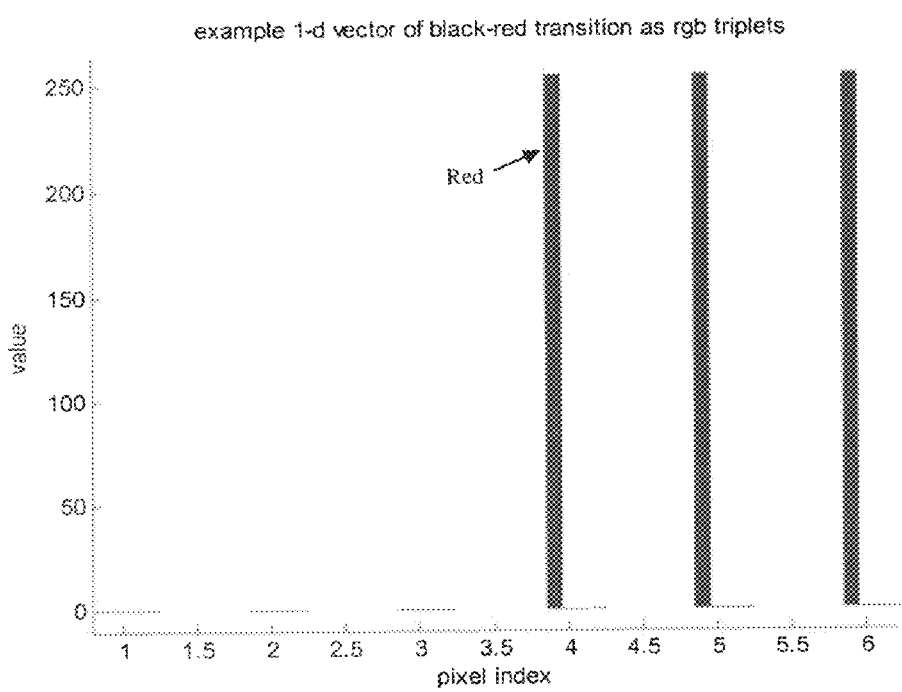
FIG. 2 shows a RGB-triplet representation of the reference picture.
Figure 3:
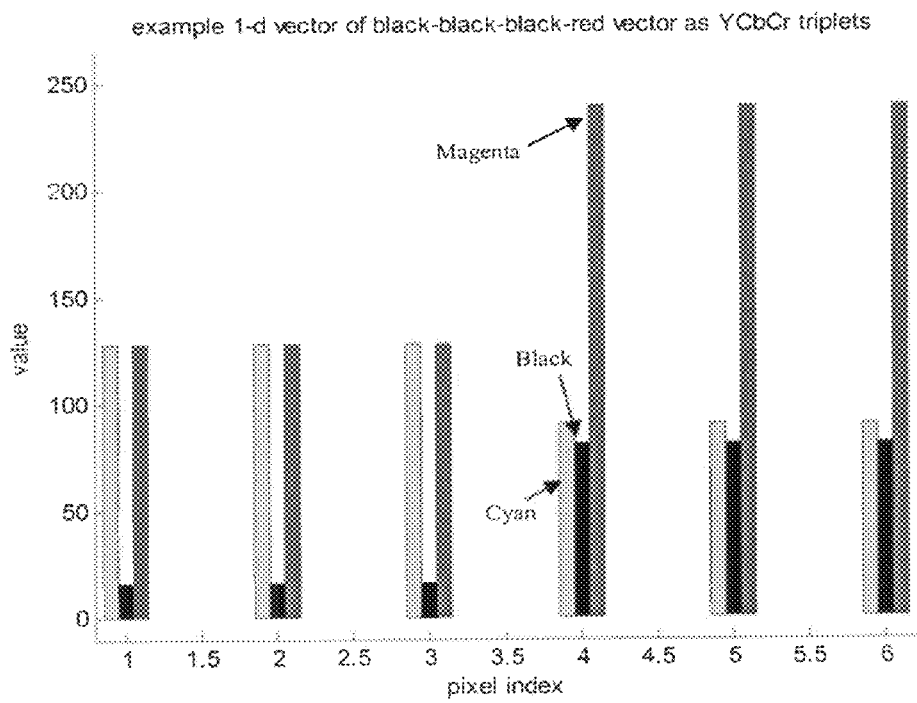
FIG. 3 shows a YCbCr-triplet representation of the reference picture.
Figure 4:
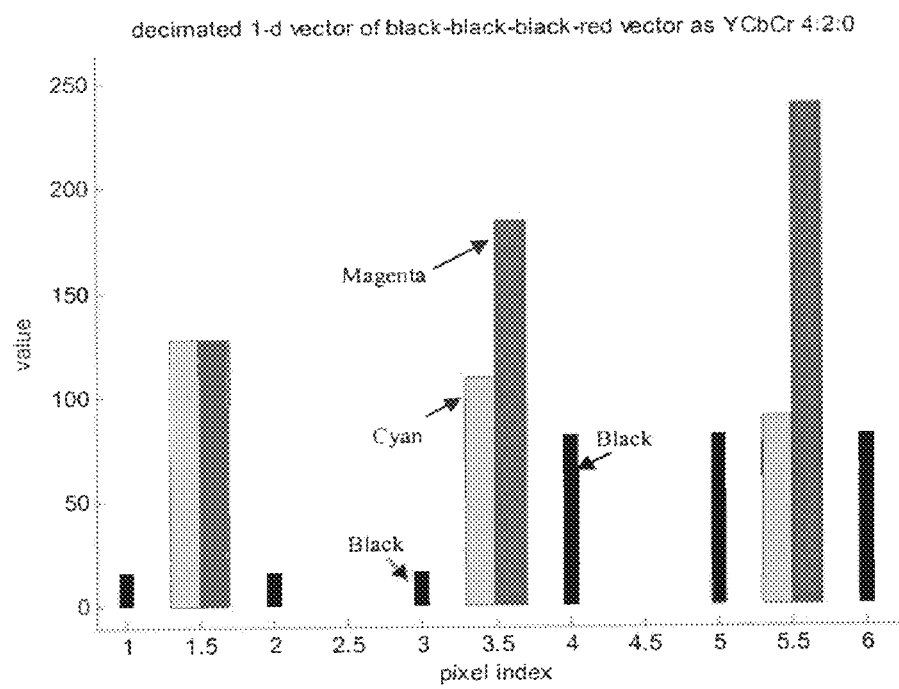
FIG. 4 shows a decimated YCbCr representation of the reference picture.
Figure 5:
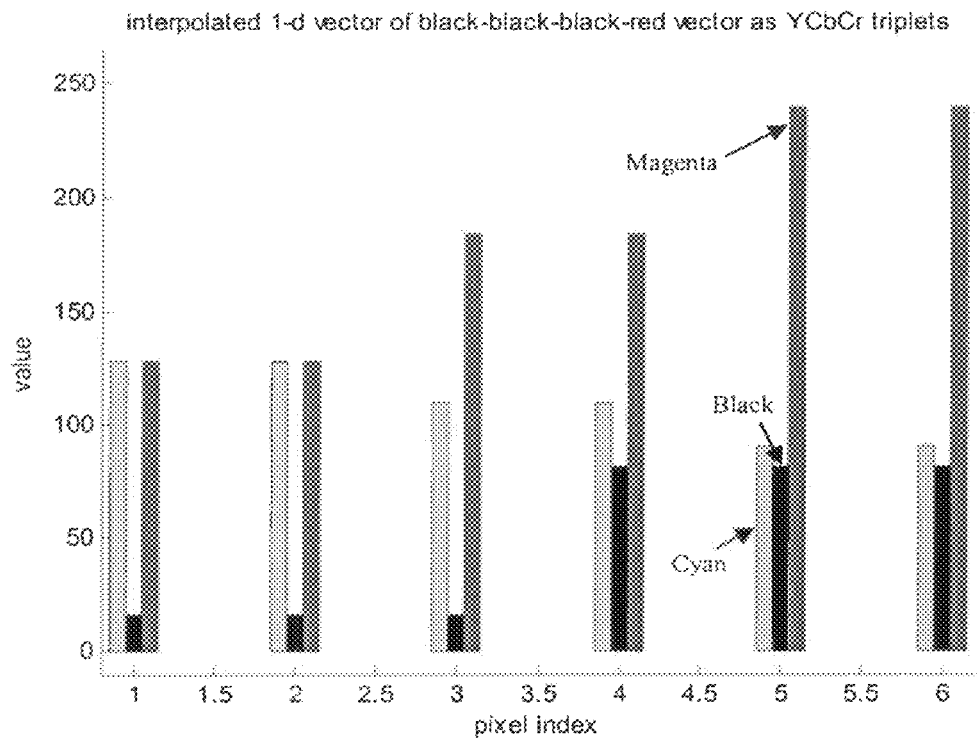
FIG. 5 shows an interpolated YCbCr representation of the reference picture.
Figure 6:
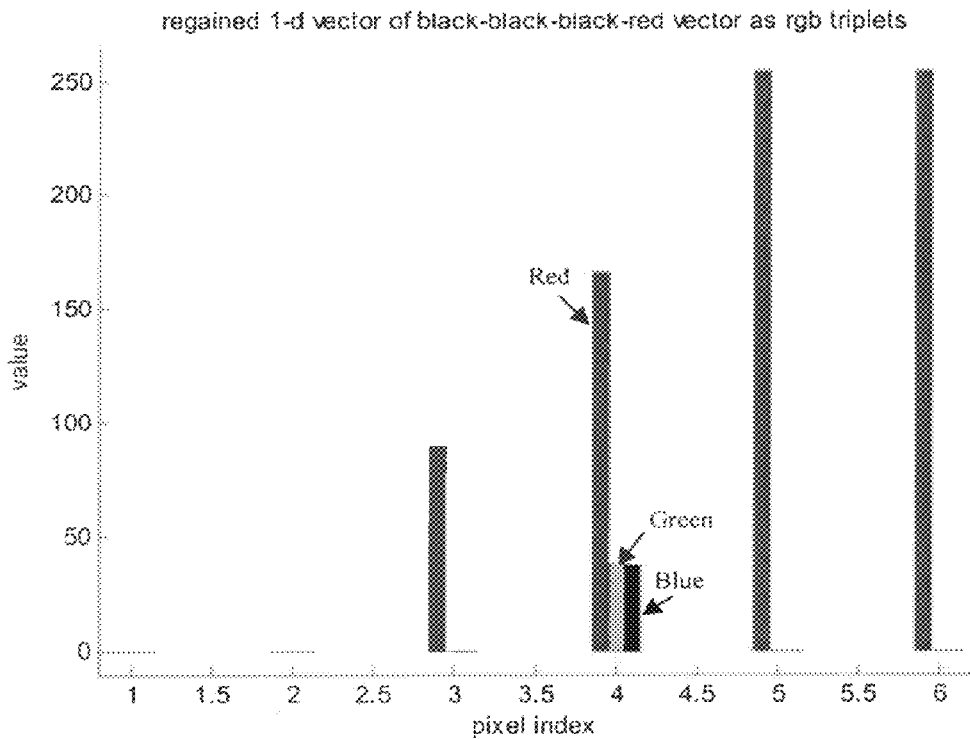
FIG. 6 shows interpolated RGB representation of the reference picture.
Figure 7:
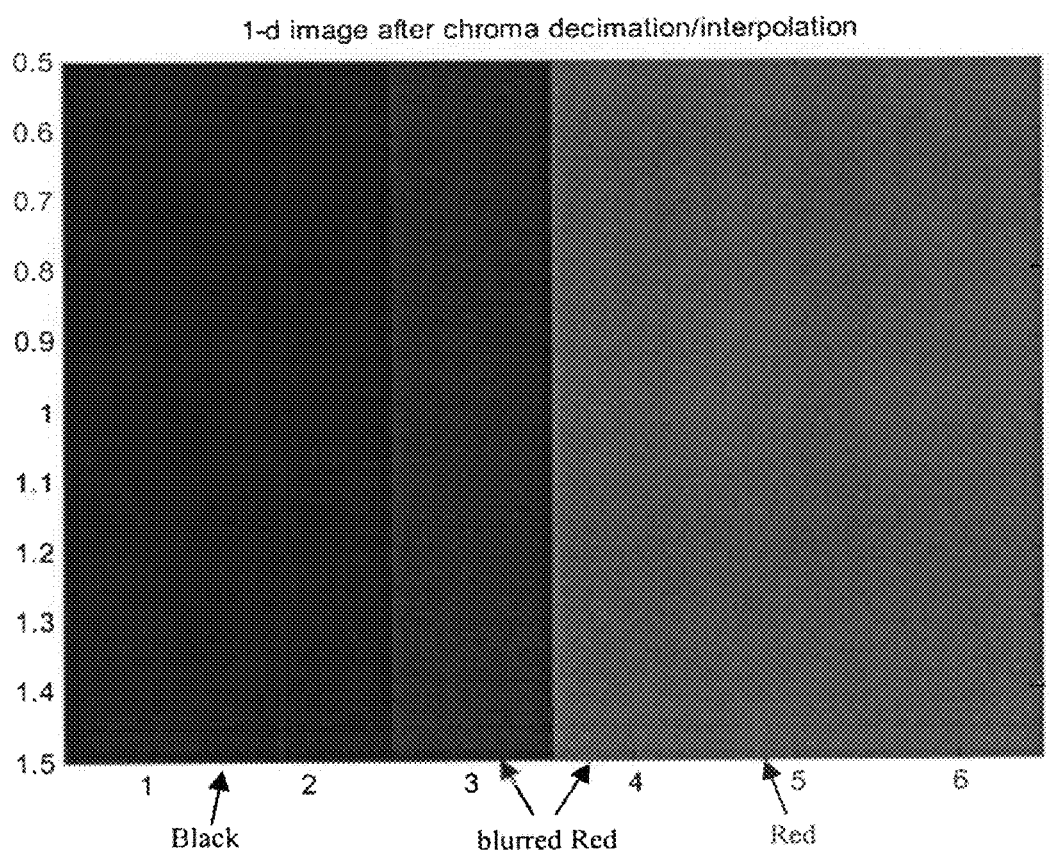
FIG. 7 illustrates the regained reference picture with color fringes along the transition.
Figure 8:
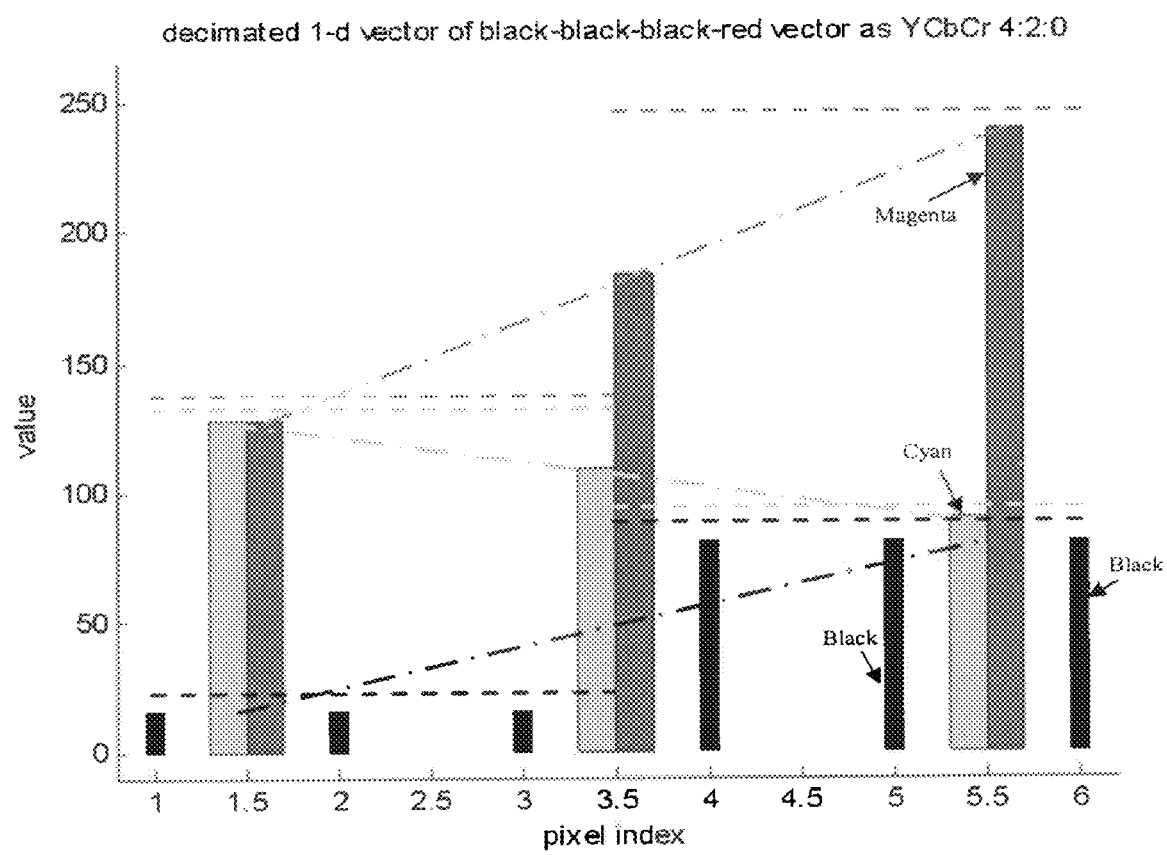
FIG. 8 illustrates a concept of finding probable smoothed edges by observing luma behavior.

FIG. 8 shows the information that would normally be available to a receiver in a conventional code-transmit-decode communication link. By decimating the locally received luma component (black bars) with the exact same process that produced the chroma component, the edge between pixels 3 and 4 will be smoothed out. The original value of luma pixel 3 is a lot closer to the value of pixels 1 and 2, while the original value of luma pixel 4 was a lot closer to pixels 5 and 6. The values of the decimated luma channel may not be the same as the decimated chroma channels, but their shape (a linear ramp in this case) suggests that they are part of a simple edge correlated in all channels of the picture. In other words, one can be expressed as a function of another: $x1=a*(x2-b)+c$, where x1 and x2 is any pair of 3-element vectors Y', Cb' and Cr'. This exemplary embodiment of the invention attempts to express chroma as a function of luma, $Cb'=a1*(Y'-b1)+c1$, $Cr'=a2*(Y'-b2)+c2$ for the available decimated channels. If a good match can be found, then it is assumed that substituting Cb' with $a1*(Y-b1)+c1$ is a better choice than interpolating Cb'. If a good match cannot be found, then this assumption cannot be made, and conventional interpolation of the available decimated chroma values is selected.

Figure 9:
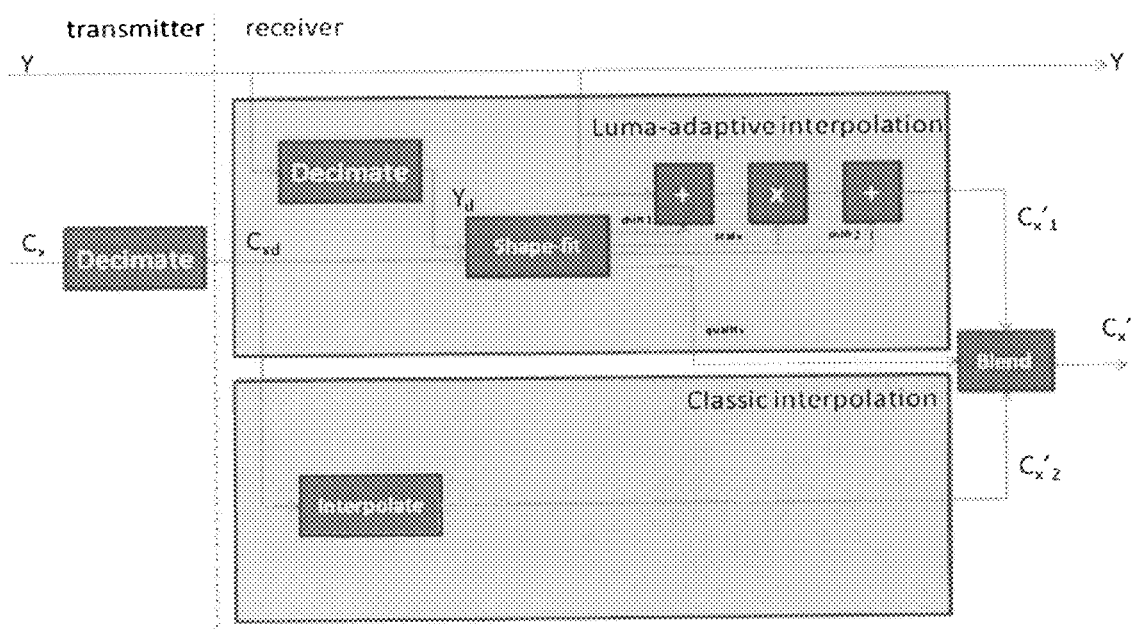
FIG. 9 shows a top-level block diagram of one exemplary embodiment of the present invention.

FIG. 9 shows a high-level block diagram of an exemplary embodiment of the invention involving a transmitter and a receiver. The transmitter and receiver may each be embodied by the exemplary computer system shown in FIG. 15 and described below. "Y" is the luma channel and "Cx" is a chroma component (e.g. Cb or Cr). Both are full-resolution. Prior to transmission across a limited bandwidth channel (and possibly video compression), the Cx channel is decimated to some sub sampling scheme, such as 4:2:2 or 4:2:0 producing Cxd. This decimation may be performed with a processor programmed to execute a decimation algorithm. The receiving side has access to Y and Cxd. As Y is already full-resolution, it can be relayed downstream for further processing. Cxd has to be interpolated to be displayed. The luma-adaptive part of the interpolation takes as inputs Y and Cxd, and generates Yd (through a decimation algorithm executed by a processor), which is a luma channel decimated with the same algorithm as that used for the chroma channel(s). In the exemplary embodiment depicted in FIG. 9, the bottom part leads to Cx'2, a new interpolation leads to Cx'1, and a "blend" component mixes these two as regulated by the "quality" of Cx'1 into a composite Cx' output of the same resolution as Y. The Blend component can also be interpreted as a linear interpolation between the selection of Cx'1 and Cx'2 controlled by the result of the fitting test in the Shape-fit box.

The purpose of the Cx'2 signal path and the blend component is to be a fall-back in cases where luma and chroma does not align well, and in that case, a similar quality to that of a conventional chroma interpolator will be achieved.

The exemplary embodiment of the present invention should operate on regions of a frame, as local statistical correlation between luma and chroma is expected to be far greater than any global correlation. However, the regular interpolation/decimation components could operate outside of the segment-based core algorithm if desirable for more flexibility, if, e.g., those are available in specialized hardware or algorithms. A region could be a part of a line, a regular block of pixels, or irregular segments based on picture segmentation. The region used for processing could be larger than the region used for output, leading to e.g. overlapped block processing.

The main purpose of the module denoted in FIG. 9 as "shape-fit" is to find 3 parameters, "shift1", "shift2" and "scale" that allows the Cxd signal to be described according to the expression mentioned as $\{(Yd+shift1)*scale\ shift2\}$ with minimum "error". The "shape-fit" module may be a processor that executes an algorithm to determine the above-noted parameters. The processor may be, for example, a Motorola 68000 or Intel 80286 micro-processor, although it will be understood by those skilled in the art that the processor may be virtually any general purpose processor of any size or speed, as this invention is by no means confined to a micro-processor environment. The premise is that any spatial blurring or other artifacts caused by decimation will be evident in both Yd and Cxd if they share edges—but not in Y. In addition, this module could also output a metric describing the quality of the fit as a function $0 \ldots 1$ where 1 is a perfect fit and 0 is no fit. Once the parameters shift1, shift2 and scale allowing Cxd to be expressed as a function of Yd is found, the parameters are applied in a corresponding way to express a new Cx'1 based on only those parameters and the full-resolution Y. That is, the new Cx'1 is found by the expression $\{(Y+shift1)*scale-shift2\}$. This will work as long as high-frequency content lost in the decimation Y→Yd are correlated with high-frequency content lost in the decimation Cx→Cxd, and a good match between Cxd and Yd can be found. The part of the exemplary embodiment of the present invention which is not regular decimation and interpolation operates on segments of the input frame, producing, e.g., one quality scalar and one separate blend of Cx'1 and Cx'2 for each segment. The full-resolution chroma pixel information (Cx) can be derived in the "blend" component from a linear mix between Cx'1 and Cx'2 according to the expression $Cx=Q*Cx1+(1-Q)*Cx2$.

Figure 10:
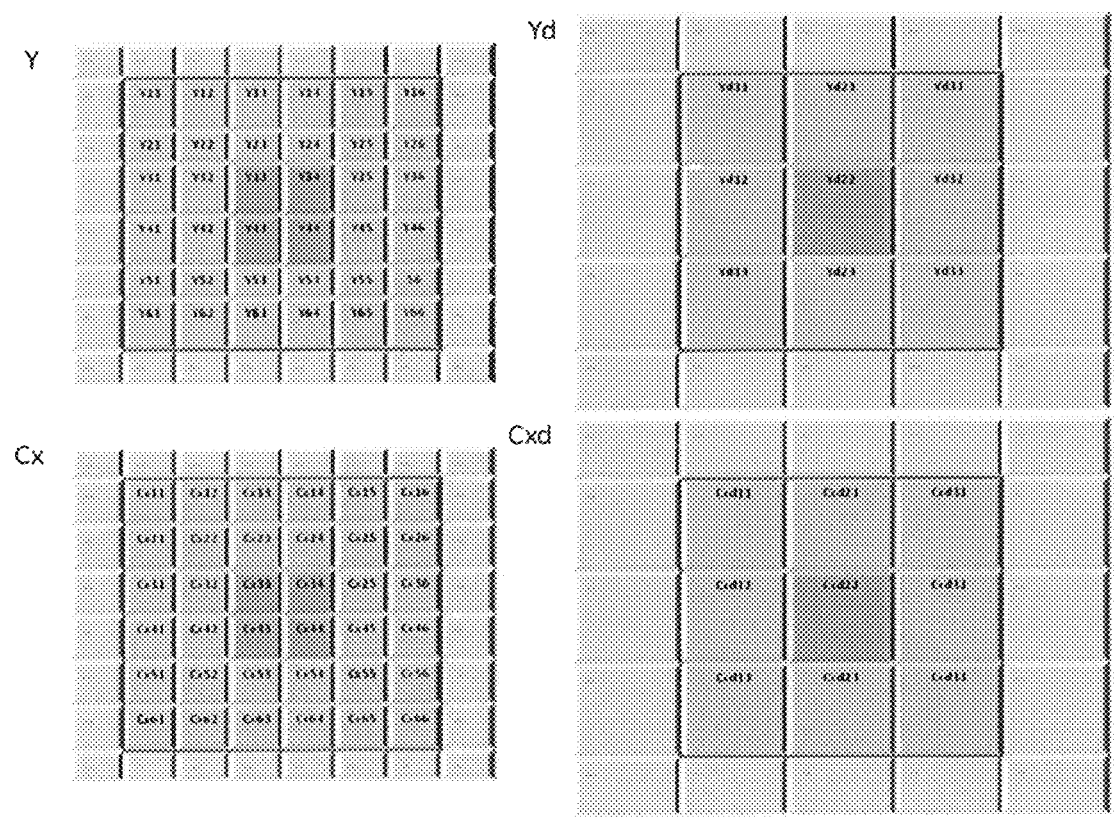
FIG. 10 illustrates a local access of luma/chroma pixels.

FIG. 10 shows a selection of 2-dimensional pixel data for luma (Y), chroma-component (Cx) in both full resolution and 2×2 decimated forms. Y and Cxd are typically already available at the receiving side, while Yd normally can be obtained at low cost by a regular decimation process. Interpolating Cxd into an estimate of Cx is a more complex process. In this example a sliding window of 6×6 luma pixels (Y11 ... Y66) corresponding to a 3×3 window of decimated pixels (Yd/Cxd11 .... Cxd66) is used to estimate Cx pixels Cx33, Cx34, Cx43 and Cx44. However, the exemplary embodiments of the present invention can be used for a number of different configurations, including overlapping windows of varying size and overlap, non-overlapping windows of varying sizes and lines or line-segments.

Figure 11:
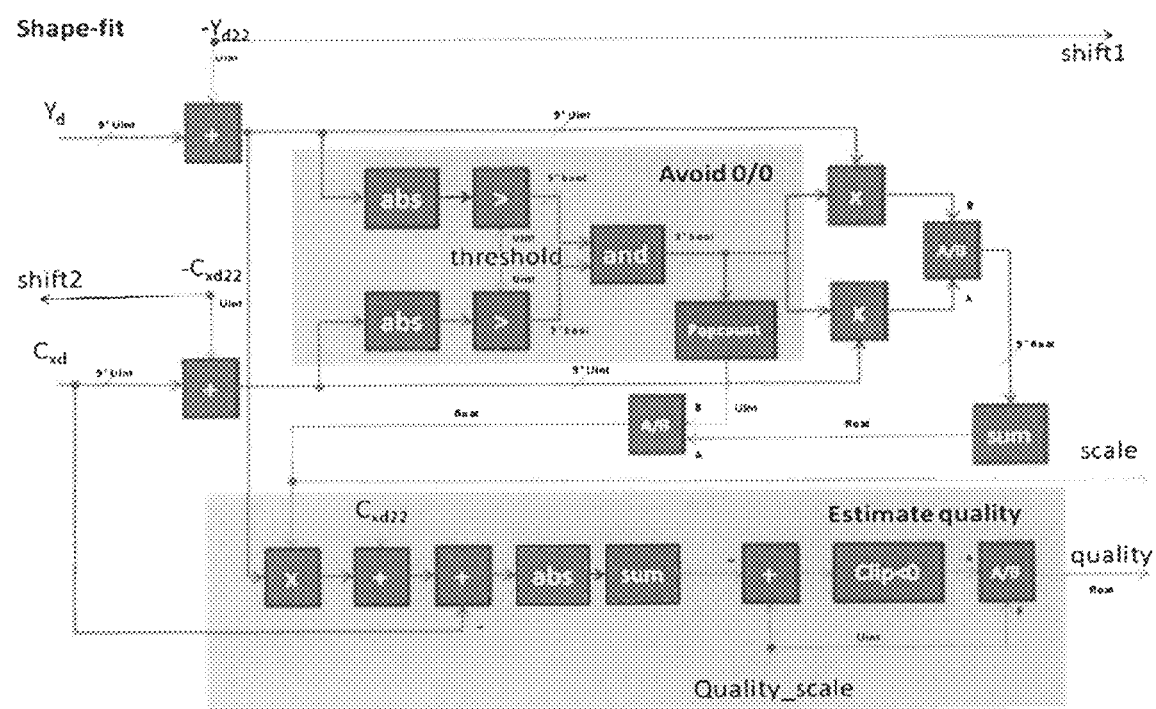
FIG. 11 shows a block diagram of an example of the "shape-fit" module in one exemplary embodiment of the present invention.

FIG. 11 shows one example of how a "shape-fit" module as shown in FIG. 9 can be implemented. It is derived from the expression of the relation between luma and chroma $Cxd=\{(Yd+shift1)*scale-shift2\}$ having shift1, shift2 and scale as output. It is apparent from the expression above that the matrix Yd and Cxd can be divided by another, after first shifting them about their center value to create the scale parameter. Shift1 and shift2 will then consequently come out as the negative of the center value of the Yd block and the Cxd block, respectively. In addition, because nominators and denominators close to zero should be avoided, a block titled "Avoid 0/0" is inserted before the division block. A quality block creating the above-mentioned quality parameter is also added. Other than that, the circuit basically consists of picking the centre values from the current 3×3 matrix of decimated Yd and Cxd values, Yd22 and Cxd22 of FIG. 10, subtracting those from the corresponding 3×3 matrixes Yd and Cxd and doing a 3×3 division.

The "Avoid 0/0" block mentioned above can be implemented in several ways. In the exemplary embodiment of the present invention illustrated in FIG. 11, for each 3×3 input matrix the element-wise absolute value is compared to a threshold to avoid excessive large or small scaling factors. For 8-bit precision, an integer of 1 or 2 seems to work well. The consequence of setting a large threshold is that a larger number of blocks will have few or no pixel entries considered "safe", and will tend to cause fall-back interpolation to be used more often. An AND-operation is performed on the Boolean outputs of the thresholding, as the division should be performed only on elements where both Yd-Yd22 and Cxd-Cxd22 are sufficiently far from 0. "Popcount" counts the number of true elements, giving a number of 0 . . . 8 (as the centre element is always false). A full 3×3 element-wise division is then carried out to the right of this module, but invalid elements are removed, the remaining elements are then summed up and scaled by their number.

Sum of Absolute Differences (SAD) is a simple vector instruction commonly found in video hardware and software for comparing the similarity of two vectors. In this case, it is used for comparing the Cxd input to an "estimated" Cxd originating from the decimated luma, Yd. The idea is that if the outputs "scale", "shift1" and "shift2" are any good for describing Cxd in terms of Yd, then the SAD of those two should be small. To define what "small" is, the output of SAD is scaled to a range of 0 . . . 1 in the last block before the output "quality" is ready. The "Quality_scale" is a fixed parameter that should be adjusted to find the optimum balance between aggressive sharpening and "safe" fall-back interpolation. If window sizes are changed, Quality_scale should be changed to reflect the total size of the vector/matrix entering the SAD block.

Figure 12:
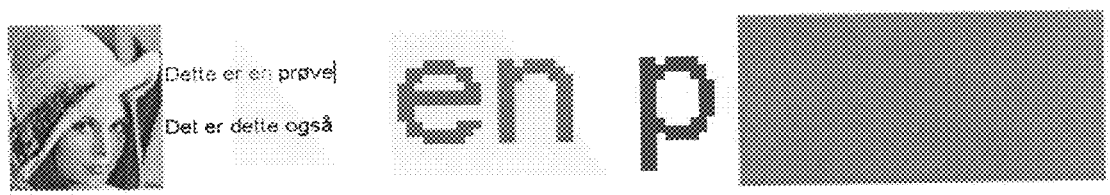
FIG. 12 shows a reference image.
Figure 13:
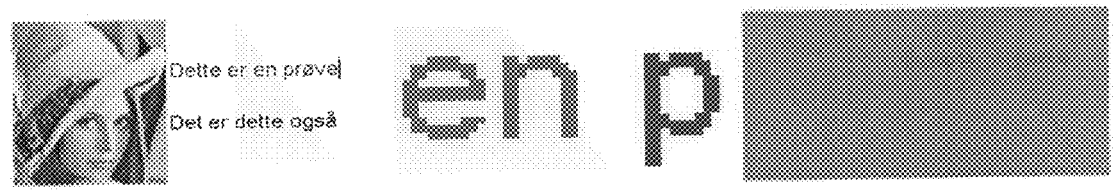
FIG. 13 shows the reference image decimated and interpolated according to a conventional technique.
Figure 14:
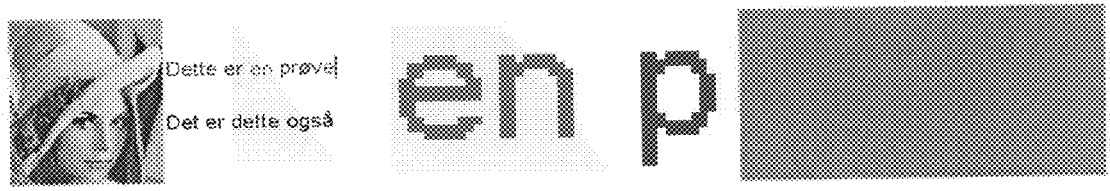
FIG. 14 shows the reference image decimated and interpolated according to an exemplary embodiment of the present invention.

FIG. 12 is a reference image (no decimation/interpolation) which is shown decimated and interpolated according to a conventional algorithm in FIG. 13, and according to the present invention in FIG. 14. It can be seen that the textual part of the image is clearly improved in FIG. 14 compared with the textual part of FIG. 13, without reducing the quality of the pictorial part of the image.

Figure 15:
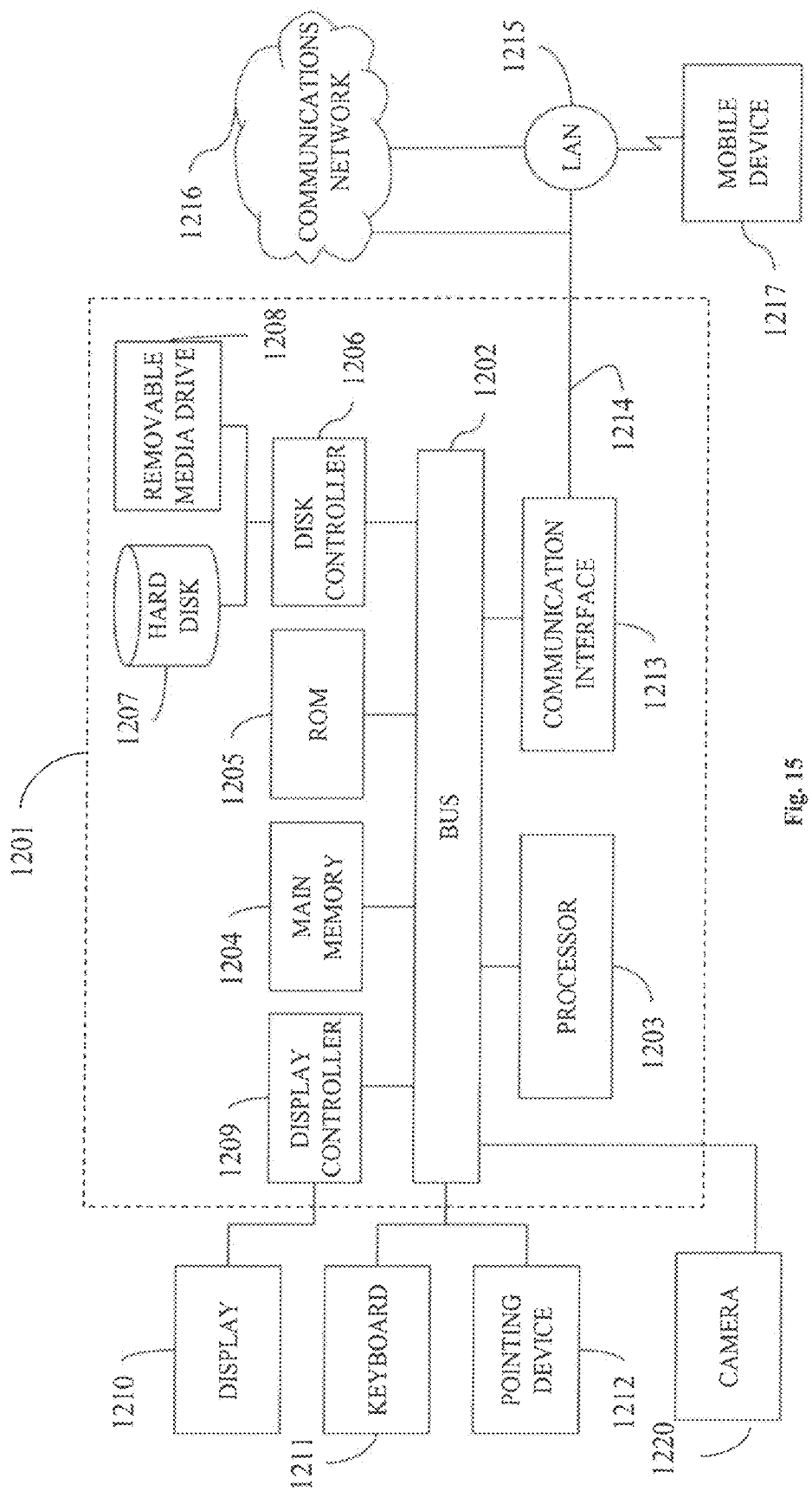
FIG. 15 is an exemplary computer system upon which an exemplary embodiment of the present invention may be implemented.

FIG. 15 illustrates a computer system 1201 upon which an embodiment of the present invention may be implemented. For example, the receiver shown in FIG. 9 may be implemented by the computer system of FIG. 12, wherein the communication interface 1213 receives information from the transmitter shown in FIG. 9 and the processor 1203 executes the algorithms discussed above and shown in FIGS. 9 and 11. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may include the decimation algorithms, the functionality of the shape-fit module discussed supra, the functionality of the luma-adaptive module discussed supra, and the functionality of the blend module discussed supra.

Furthermore, such instructions may be read into the main memory 1204 from another computer readable storage medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable storage medium or memory for holding instructions programmed according to the teachings of the exemplary embodiments of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, or any other physical medium from which a computer can read.

Stored on any one or on a combination of computer readable media, the exemplary embodiments of the present invention include software for controlling the computer system 1201, for driving a device or devices for implementing the invention, and for enabling the computer system 1201 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the exemplary embodiments of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost. The term "computer readable storage medium" as used herein refers to any physical medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable storage media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term is "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The exemplary embodiments of the present invention described herein improve legibility and perceived quality of text and line-sharpness for image content typical of that originating in a computer or other synthetic image/video sources without exaggerating channel-noise or over-sharpening edges. Its relatively low complexity makes it feasible in a real-time communication context.

The invention claimed is:

1. A method in a decoding process for determining full-resolution chroma pixel information (Cx) corresponding to a spatial fraction of a still-image or a video-frame represented by full-resolution luma pixel information (Y) and decimated chroma pixel information (Cxd) decimated by a decimation process, comprising:

receiving the full-resolution luma pixel information at video or image processing apparatus;

decimating, at the video or image processing apparatus, the full-resolution luma pixel information (Y) by said decimation process resulting in a decimated spatial luma fraction (Yd);

determining, with the video or image processing apparatus, if the decimated chroma pixel information (Cxd) at least approximately can be expressed by $\{(Yd+shift1)*scale-shift2\}$, wherein the spatial fraction corresponds to a square block of pixels, and the shift1 is $-Yd_{center}$, where $Yd_{center}$ is a center pixel value of Yd, the shift2 is $-Cxd_{center}$, where $Cxd_{center}$ is a center pixel value of Cxd, and the scale is $(Cxd+shift2)/(Yd+shift1)$;

storing, in an electronic memory of the video or image processing apparatus, values of scale, shift1, and shift2 that result in a minimum deviation between $\{(Yd+shift1)*scale-shift2\}$ and Cxd; and calculating, with the video or image processing apparatus, $\{(Y+shift1)*scale-shift2\}$ as a first candidate (Cx 1) for the full-resolution chroma pixel information (Cx)".

2. The method according to claim 1, further comprising:

calculating a quality parameter (Q) by comparing $\{(Yd+shift1)*scale-shift2\}$ with Cxd;

interpolating Cxd, by an interpolation process corresponding to the decimation process, resulting in a second candidate (Cx2) for the full-resolution chroma pixel information (Cx); and combining the first and the second candidates according to the quality parameter to create the full-resolution chroma pixel information (Cx).

3. The method according to claim 2, wherein
the quality parameter is a floating number from 0 to 1, wherein 0 appears when there is no match between {(Yd+shift1)*scale−shift2} and Cxd, and 1 appears when there is an optimal match between {(Yd+shift1)*scale−shift2} and Cxd.

4. The method according to claim 2, wherein the step of combing the first and the second candidates according to the quality parameter includes creating the full-resolution chroma pixel information (Cx) as a linear mix between the first and second candidates according to an expression Cx=Q*Cx1+(1−Q)*Cx2.

5. The method according to claim 1, wherein
the full resolution chroma pixel information includes blue chroma difference information.

6. The method according to claim 1, wherein the full resolution chroma pixel information includes red chroma difference information.

7. An apparatus configured to implement a decoding process for determining full-resolution chroma pixel information (Cx) corresponding to a spatial fraction of a still-image or a video-frame represented by full-resolution luma pixel information (Y) and decimated chroma pixel information (Cxd) decimated by a decimation process, comprising:
a decimator that decimates the full-resolution luma pixel information (Y) by said decimation process resulting in a decimated spatial luma fraction (Yd); a processor configured to determine if the decimated chroma pixel information (Cxd) at least approximately can be expressed by {(Yd+shift1)*scale−shift2}, wherein the spatial fraction corresponds to a square block of pixels, and the shift1 is $-Yd_{center}$, where $Yd_{center}$ is a center pixel value of Yd, the shift2 is $-Cxd_{center}$, where $Cxd_{center}$ is a center pixel value of Cxd, and the scale is (Cxd+shift2)/(Yd+shift1); and
a memory that stores values of scale, shift1, and shift2 that result in a minimum deviation between {(Yd+shift1)*scale−shift2} and Cxd,
wherein the processor is configure to calculate {(Y+shift1)*scale−shift2} as a first candidate (Cx1) for the full-resolution chroma pixel information (Cx).

8. The apparatus according to claim 7, wherein the processor is further configured to
calculate a quality parameter (Q) by comparing {(Yd+shift1)*scale−shift2} with Cxd,
interpolate Cxd, by an interpolation process corresponding to the decimation process, resulting in a second candidate (Cx2) for the full-resolution chroma pixel information (Cx), and
to combine the first and the second candidates according to the quality parameter to create the full-resolution chroma pixel information (Cx).

9. The apparatus according to claim 7, wherein
the quality parameter is a floating number from 0 to 1, wherein 0 appears when there is no match between {(Yd+shift1)*scale−shift2} and Cxd, and 1 appears when there is an optimal match between {(Yd+shift1)*scale−shift2} and Cxd.

10. The apparatus according to claim 7, wherein the processor is further configured to create the full-resolution chroma pixel information (Cx) as a linear mix between the first and second candidates according to an expression Cx=Q*Cx1+(1−Q)*Cx2.

11. The apparatus according to claim 7, wherein
the full resolution chroma pixel information includes blue chroma difference information.

12. The apparatus according to claim 7, wherein the full resolution chroma pixel information includes red chroma difference information.

13. A non-transitory computer readable storage medium encoded with instructions, which when executed by a computer cause the computer to implement a method in a decoding process for determining full-resolution chroma pixel information (Cx) corresponding to a spatial fraction of a still-image or a video-frame represented by full-resolution luma pixel information (Y) and decimated chroma pixel information (Cxd) decimated by a decimation process, the method comprising:
decimating the full-resolution luma pixel information (Y) by said decimation process resulting in a decimated spatial luma fraction (Yd);
determining if the decimated chroma pixel information (Cxd) at least approximately can be expressed by {(Yd+shift1)*scale−shift2}, wherein the spatial fraction corresponds to a square block of pixels, and the shift1 is $-Yd_{center}$, where $Yd_{center}$ is a center pixel value of Yd, the shift2 is $-Cxd_{center}$, where $Cxd_{center}$ is a center pixel value of Cxd, and the scale is (Cxd+shift2)/(Yd+shift 1);
storing values of scale, shift1, and shift2 that result in a minimum deviation between {(Yd+shift1)*scale−shift2} and Cxd; and
calculating {(Y+shift1)*scale−shift2} as a first candidate (Cx1) for the full-resolution chroma pixel information (Cx).

14. The non-transitory computer readable storage medium of claim 13, wherein the method further comprises:
calculating a quality parameter (Q) by comparing {(Yd+shift1)*scale−shift2} with Cxd;
interpolating Cxd, by an interpolation process corresponding to the decimation process, resulting in a second candidate (Cx2) for the full-resolution chroma pixel information (Cx); and
combining the first and the second candidates according to the quality parameter to create the full-resolution chroma pixel information (Cx).

15. The non-transitory computer readable storage medium of claim 14, wherein the quality parameter is a floating number from 0 to 1, wherein 0 appears when there is no match between {(Yd+shift1)*scale−shift2} and Cxd, and 1 appears when there is a match between {(Yd+shift1)*scale−shift2} and Cxd.

16. The non-transitory computer readable storage medium of claim 14, wherein the step of combing the first and the second candidates according to the quality parameter includes creating the full-resolution chroma pixel information (Cx) as a linear mix between the first and second candidates according to an expression Cx=Q*Cx1+(1−Q)*Cx2.

* * * * *